United States Patent
Dos Reis Frazão et al.

(10) Patent No.: US 10,883,890 B2
(45) Date of Patent: Jan. 5, 2021

(54) LINEAR CAVITY RING DOWN DEVICE

(71) Applicant: INESC TEC—INSTITUTO DE ENGENHARIA DE SISTEMAS E COMPUTADORES, TECNOLOGIA E CIÊNCIA, Oporto (PT)

(72) Inventors: Orlando José Dos Reis Frazão, Oporto (PT); Susana Ferreira De Oliveira Silva, Oporto (PT)

(73) Assignee: INESC TEC—INSTITUTO DE ENGENHARIA DE SISTEMAS E, Oporto (PT)

( * ) Notice: Subject to any disclaimer, the term of this patent is extended or adjusted under 35 U.S.C. 154(b) by 0 days.

(21) Appl. No.: 16/637,964

(22) PCT Filed: Aug. 10, 2018

(86) PCT No.: PCT/IB2018/056046
§ 371 (c)(1),
(2) Date: Feb. 10, 2020

(87) PCT Pub. No.: WO2019/030721
PCT Pub. Date: Feb. 14, 2019

(65) Prior Publication Data
US 2020/0182717 A1 Jun. 11, 2020

(30) Foreign Application Priority Data

Aug. 10, 2017 (PT) .......................................... 110249
Aug. 25, 2017 (EP) .................................... 17188045

(51) Int. Cl.
*G01N 21/00* (2006.01)
*G01N 21/17* (2006.01)
(Continued)

(52) U.S. Cl.
CPC .............. *G01L 1/246* (2013.01); *G01N 21/00* (2013.01); *G01N 21/17* (2013.01); *G01N 21/412* (2013.01);
(Continued)

(58) Field of Classification Search
None
See application file for complete search history.

(56) References Cited

U.S. PATENT DOCUMENTS

2009/0122317 A1   5/2009   Ito et al.
2017/0366257 A1*  12/2017  Hayward ........... G01M 11/3127

OTHER PUBLICATIONS

Silva S et al, "Fiber cavity ring-down for strain sensing using an OTDR", 2014 Third Mediterranean Photonics Conference, IEEE, May 7, 2014 (May 7, 2014), p. 1-3.
(Continued)

*Primary Examiner* — Michelle R Connelly
(74) *Attorney, Agent, or Firm* — Leason Ellis LLP

(57) ABSTRACT

Fibre linear cavity ring down device for decay time-based attenuation sensing, comprising a bi-directional fibre optic coupler having two fibre port coupling sides, a left-hand port side and a right-hand port side, and a port mirror; wherein signal input on one of said sides is coupled to signal output on the other of said sides; wherein the left-hand port side comprises a first fibre port (port 1) for coupling to an optical light source, the left-hand port side comprises a second fibre port (port 2) coupled to said port mirror (mirror 2), and the right-hand port side comprises a third fibre port (port 3) for coupling to a sensor fibre comprising one or more sensors and optically terminated by a sensor fibre mirror (mirror 1). The optical light source may be also an optical light receiver. The optical light source and receiver may preferably be an optical time domain reflectometer.

19 Claims, 10 Drawing Sheets

(51) Int. Cl.
  *G02B 6/28* (2006.01)
  *G01L 1/24* (2006.01)
  *G01N 21/41* (2006.01)
(52) U.S. Cl.
  CPC ..... *G02B 6/2861* (2013.01); *G01N 2201/088* (2013.01); *G01N 2201/0886* (2013.01)

(56) References Cited

OTHER PUBLICATIONS

Barnes J A et al, "Chemical sensing using a polymer coated long-period fiber grating interrogated by ring-down spectroscopy", Sensors and Actuators B: Chemical: International Journal Devoted to Research and Development of Physical and Chemical Transducers, vol. 148, No. 1, Apr. 24, 2010 (Apr. 24, 2010), p. 221-226.

Silva S et al, "Fiber-Optic Cavity Ring Down Using an Added-Signal for Curvature Sensing", Oct. 1, 2015 (Oct. 10, 2015), vol. 27, No. 19, p. 2079-2082.

D. Z. Anderson, J. C. Frisch, and C. S. Masser, "Mirror reflectometer based on optical cavity decay time," Appl. Opt., vol. 23, No. 8, pp. 1238-1245, 1984.

R. S. Brown, I. Kozin, Z. Tong, R. D. Oleschuk, and H.-P. Loock, "Fiber-loop ring-down spectroscopy," J. Chem. Phys., vol. 117, No. 23, pp. 10444-10447, 2002.

D. J. Passos, S. O. Silva, J. R. A. Fernandes, M. B. Marques, and O. Frazão, "Fiber Cavity Ring-down Monitoring with an Optical Time-Domain Reflectometer," Photonic Sensors, vol. 4, No. 4, pp. 295-299, 2014.

S. Silva, D. J. Passos, M. B. Marques, and O. Frazao, "Chirped Fiber Bragg Grating Cavity Ring-down for Strain Sensing Using an OTDR," Microwave Optical Technol Lett, vol. 57, No. 6, pp. 1442-1444, 2015.

S. Silva, M. B. Marques, and O. Frazão, "Cavity ring-down technique for remote sensing," Microwave and Optical Technology Letters, vol. 58, No. 11, pp. 2711-2713, 2016.

M. P. Gold, A. H. Hartog, and D. N. Payne, "A new approach to splice-loss monitoring using long-range OTDR," Electron. Lett., vol. 20, No. 8, pp. 338-340, 1984.

* cited by examiner

Mirror-based fibre loop mirror

LINEAR CAVITY RING DOWN DEVICE

CROSS-REFERENCE TO RELATED APPLICATIONS

This application is a U.S. National Stage Application under 35 U.S.C. § 371 of International Patent Application No. PCT/IB2018/056046, filed Aug. 10, 2018 which claims priority to European Patent Application No. 17188045.3, filed Aug. 25, 2017 and Portugal Patent Application No. 110249, filed Aug. 10, 2017, the contents of which are each hereby incorporated by reference in their respective entireties.

TECHNICAL FIELD

The present disclosure relates to a fibre linear cavity ring down, CRD, device with particular application for remote sensing.

BACKGROUND

The cavity ring-down, CRD, technique comprises two main configurations that are the basis of the known state-of-the-art: The first one uses two highly reflective mirrors thus forming a linear cavity [1], while the second one uses two fibre couplers with high splitting ratios that form a cavity ring [2]. In the first configuration, a light impulse is sent into the cavity and travels inside it by multiple internal reflections. The part of light that comes out in each turn is monitored at the output. The result is a decaying exponential behaviour of the signal's intensity with time. In the second configuration, the impulse is sent into the cavity and rings around at certain amount of time. In each loop, the intensity of the impulse decays with time and, in a similar way, an exponential behaviour is observed at the system's output.

The advantages of using CRD include: high sensitivity due to the multipass of the sensor, imperviousness to variations in laser intensity due to the measurement of a rate constant, wide range of use for a given set of mirrors, and high throughput.

The cavity ring is the most common configuration used in fibre-based CRD. Several schemes have already been reported for sensing. An improvement of this technique was the use of the optical time domain reflectometer (OTDR) for sending the modulated light into the cavity ring. In 2014, this configuration was reported as a proof-of-concept for displacement sensing [3].

The OTDR is a commercial device widely used for measuring losses along several kilometers of optical fibre [4]. Early it was shown to be a promising device in measuring point-by-point losses, by using intensity sensors along the fibre. Several works have been reported in this area of research, where an OTDR is used to monitor sensors such as fibre Bragg gratings (FBGs), long period gratings (LPGs), multimode interference (MMI), fibre loop mirrors and others. When integrated in a CRD configuration, the OTDR has shown to be an excellent tool to be used as both input and output device. In 2015, the CRD technique was presented for strain sensing, where a chirped-FBG was used as sensing element and the signal's output was monitored by an OTDR [5]. Later in that year, a similar configuration was reported for measuring curvature, but in this case, a LPG was used instead as sensing device [6].

In 2016, a configuration for remote sensing was demonstrated [7]. The cavity ring was modified with an inclusion of an optical circulator and erbium doped fibre amplifier (EDFA). In this case, a thin-film mirror was inserted at the end of 20 km of fibre. The main limitation of this configuration is the intrinsic high losses of the optical circulator that obliges applying an EDFA in the cavity ring in order to compensate them.

These facts are disclosed in order to illustrate the technical problem addressed by the present disclosure.

REFERENCES

[1] D. Z. Anderson, J. C. Frisch, and C. S. Masser, "Mirror reflectometer based on optical cavity decay time," Appl. Opt., vol. 23, no. 8, pp. 1238-1245, 1984.

[2] R. S. Brown, I. Kozin, Z. Tong, R. D. Oleschuk, and H.-P. Loock, "Fiber-loop ring-down spectroscopy," J. Chem. Phys., vol. 117, no. 23, pp. 10444-10447, 2002.

[3] D. J. Passos, S. O. Silva, J. R. A. Fernandes, M. B. Marques, and O. Frazão, "Fiber Cavity Ring-down Monitoring with an Optical Time-Domain Reflectometer," Photonic Sensors, vol. 4, no. 4, pp. 295-299, 2014.

[4] M. P. Gold, A. H. Hartog, and D. N. Payne, "A new approach to splice-loss monitoring using long-range OTDR," Electron. Lett., vol. 20, no. 8, pp. 338-340, 1984.

[5] S. Silva, D. J. Passos, M. B. Marques, and O. Frazão, "Chirped Fiber Bragg Grating Cavity Ring-down for Strain Sensing Using an OTDR," Microwave Optical Technol Lett, vol. 57, no. 6, pp. 1442-1444, 2015.

[6] S. Silva, P. Biswas, S. Bandyopadhyay, P. A. Jorge, M. B. Marques, and O. Frazão "Fiber-Optic Cavity Ring Down using an Added-Signal for Curvature Sensing," Photon. Technol. Lett., vol. 27, no. 19, pp. 2079-2082, 2015.

[7] S. Silva, M. B. Marques, and O. Frazão, "Cavity ring-down technique for remote sensing," Microwave and Optical Technology Letters, vol. 58, no. 11, pp. 2711-2713, 2016.

General Description

The present disclosure relates to a fibre linear cavity ring down with application in particular for remote sensing. The disclosed configuration uses a single fibre coupler and two thin-film mirrors located at the end of the fibre arms, in order to attain decay time-based analysis of the measured parameters. The new approach can be considered an improvement upon the prior art fibre cavity ring-down technique. The disclosed configuration is no longer a cavity ring but a linear cavity. The linear cavity is created with a single fibre coupler, for example of 99:1, and two thin-film mirrors located at the end of the fibre arms. This configuration is used in reflection. However the reflection interrogation presents better resolution relatively to signal-to-noise ratio in the decay time measurement when compared with conventional configuration where the interrogation is in transmission. The mirrors can be also replaced by fibre Bragg gratings and fibre loop mirrors, or equivalent mirroring devices. One of the main advantages of this improvement is its use for remote sensing. However, it may be necessary to include amplification in the cavity to eliminate fibre length losses. This configuration allows using any intensity-based optical fibre sensor in the literature with twice improvement in the sensitivity and can be easily adapted to a commercial system. An embodiment for strain sensing is demonstrated. This disclosed simplification opens new paths in physical, chemical or biological parameters using this fibre configuration.

The coupler being a passive device is immune to EMI, consumes no electrical power and does not add noise to system design.

The disclosed configuration includes a linear cavity using a single fibre coupler and two mirrors located at the end of the fibre arms. An OTDR is used as both input and output device, as already demonstrated with a conventional CRD using a fibre cavity ring [11]. The use of mirrors in this configuration is of importance in order to ensure the maximum resolution of the measured signal. The mirrors can also be replaced by fibre Bragg gratings (FBG) and fibre loop mirrors, or other equivalent mirror devices. As an example, the linear cavity demonstrator may use a FBG as mirror and simultaneously as strain sensor. This type of fibre sensor was already used for strain sensing as demonstrated by the authors with a conventional CRD using a fibre cavity ring [12].

The fibre coupler can be a 1×2 or a 2×2 fibre optic bi-directional coupler. For each of its two sides, a 2×2 coupler combines the light on one side and splits it on the other side. A 1×2 coupler works in the same way, but one of the input fibres has been cut short, so that one side of the coupler has one fibre and the other side has two fibres, but the fundamental functioning is the same, merely one of the ports is inaccessible.

Fibre couplers have input and output configurations defined as M×N. M is the number of input ports (one or more). N is the number of output ports and, by convention, is usually equal to or greater than M. When there are multiple inputs, output signals are always a combination of the input signals—a coupler can also be considered a combiner. Because the coupler is bi-directional, then the inputs/outputs are reversible, such that a 1×2 or a 2×1 coupler are the same and, by convention, these are usually called 1×2 couplers.

The split does not need to be 50:50, and in fact for the present disclosure a ratio of not 50/50 is preferable. For the present disclosure a ratio of, for example, 99:1 is preferable. The ratio would be higher as possible such that sufficient light is reflected between the mirrors. The ratio should not be so high that sufficient light is leaked out for measurement.

Typically, in a coupler the cores of two identical parallel fibres are so close to one another that the evanescent wave can "leak" from one fibre core into the other core. The amount of energy exchange is dependent upon the proximity of the two cores and the length over which this exchange takes place. It is easy to see that if the coupling length is long enough, a complete transfer of energy can take place from one core into the other. If the length is longer still, the process will continue, shifting the energy back into the original core. By selecting the proper length, any given power transfer ratio can be realized. This is how a 50/50 or a 10/90 coupler is made.

A coupler can also be referred as a tap or splitter.

It is also demonstrated the viability of this new CRD technique for remote sensing in a maximum of 10 km. The disclosed configuration is highly attractive for remote sensing. It has already been demonstrated the viability of conventional CRD using a fibre cavity ring for remote sensing [13]. However, such feature was only possible with the inclusion of an optical circulator, which inserts high losses in the cavity ring.

Furthermore, the ring configuration needs two fibres, one for signal transmission and other for signal reception. This is not so practical for remote sensing solutions.

The disclosed CRD configuration comprises a single fibre coupler with highly reflective mirrors at the end of the fibre arms form the linear cavity. In addition, the use of an OTDR serves as both input/output of the transmitted/reflected signal. Therefore, the oscilloscope (and photodetector) at the output is no longer needed to interrogate the sensing head as the OTDR serves that purpose (as already demonstrated in [11]). This is one of the major advantages of the proposed CRD configuration, combining the fact that the output signal acquired by the OTDR provides measurements in dB, which allows attaining the decay time with a linear response (rather than an exponential behaviour obtained by the oscilloscope). In addition, an increase of the sensitivity is achieved because the light passes twice by the sensor [13]. Another advantage is that the mirrors can be based on highly reflective thin-films, fibre loop mirrors, external mirrors, faraday rotators or even FBGs.

In addition, the FBG may be used as both sensing structure and mirror. Comparing with other CRD configurations, this new linear CRD is of easy assembling and compact size.

The disclosed configuration can be used with several sensors, which allows its application in the monitoring of physical and biological parameters, either in liquid or gas medium.

Also, it can be incorporated in commercial systems such as the OTDR, for reading and receiving signals, due to its easy integration and the fact that it is a compact configuration. It has applications for oil companies, mines, power plants, nuclear reactors, refineries and others.

It is disclosed a fibre cavity ring-down technique based on a linear configuration. The disclosed approach includes a linear cavity using a fibre coupler and two thin-film mirrors located at the end of the fibre arms. The mirrors can be replaced by fibre Bragg gratings, fibre loop mirrors or other equivalent mirror devices. The linear CRD was also demonstrated for remote sensing by means of three different fibre lengths, in a maximum of 10 km, placed in one arm of the fibre coupler. As a proof-of-concept for sensing, the linear cavity embodiment relied on using a FBG as mirror and simultaneously as strain sensor. The disclosed linear CRD configuration uses a single fibre coupler with two highly reflective mirrors; uses OTDR as both input and output device; and may use different types of mirrors that can be used as sensor elements, thus featuring remote sensing in a compact and simple configuration. When compared to the conventional fibre cavity ring-down, the simplicity of the configuration is a significant feature, as the elimination of one of the couplers allows acquiring the reflected output signal and the elimination of splices between couplers.

It is disclosed a fibre linear cavity ring down device for decay time-based attenuation sensing, comprising a port mirror and a bi-directional fibre optic coupler having two fibre port coupling sides, a left-hand (or first) port side and a right-hand (or second) port side;

wherein the left-hand port side comprises a first fibre port (for example, port 1), and a second fibre port (for example, port 2) coupled to said port mirror (for example, mirror 2); and the right-hand port side comprises a third fibre port (for example, port 3) for coupling to a sensor fibre comprising one or more sensors and optically terminated by a mirror of the sensor fibre (for example, mirror 1), and a fourth fibre port (for example, port 4);

wherein the first fibre port (for example, port 1) is an input for coupling to an optical light source, or the fourth fibre port (for example, port 4) is an input for coupling to an optical light source.

It is also disclosed a fibre linear cavity ring down device for decay time-based attenuation sensing, comprising a port mirror, a bi-directional fibre optic coupler having two fibre port coupling sides, a left-hand (or first) port side and a right-hand (or second) port side, and an optical time domain reflectometer;

wherein the left-hand port side comprises a first fibre port (for example, port 1), and a second fibre port (for example, port 2) coupled to said port mirror (for example, mirror 2); and the right-hand port side comprises a third fibre port (for example, port 3) for coupling to a sensor fibre comprising one or more sensors and optically terminated by a mirror of the sensor fibre (for example, mirror 1), and a fourth fibre port (for example, port 4);

wherein either the first fibre port (for example, port 1) is coupled to the optical time domain reflectometer as an optical light source and receiver, as both input and output fibre port, or the fourth fibre port (for example, port 4) is coupled to the optical time domain reflectometer as an optical light source and receiver, as both input and output fibre port.

A bi-directional fibre optic coupler has two sides, such that signal that is input to one of said sides is coupled to signal that is output from the other of said sides with a predetermined splitting ratio between the fibre ports of said other side.

The bi-directional fibre optic coupler may comprise two coupled optical fibres:

a first optical fibre between the first fibre port and third fibre port, and a second optical fibre between the second fibre port and fourth fibre port.

It is also disclosed the use of a fibre linear cavity ring down device as a decay time-based attenuation sensing device, comprising a bi-directional fibre optic coupler having two fibre port coupling sides, a first port side and a second port side, and a port mirror;

wherein the first port side comprises a first fibre port, and a second fibre port coupled to said port mirror;

wherein the second port side comprises a third fibre port for coupling to a sensor fibre comprising one or more sensors and optically terminated by a mirror of said sensor fibre, and a fourth fibre port;

for coupling either the first fibre port or the fourth fibre port to an optical time domain reflectometer being used as an optical light source and receiver.

In an embodiment, the optical light source is also an optical light receiver and the input fibre port is also an output fibre port.

In an embodiment, the optical light source and receiver is an optical time domain reflectometer.

In an embodiment, the first fibre port (for example, port 1) is an input for coupling to an optical light source and the fourth fibre port (for example, port 4) is an output for coupling to an optical light receiver; or the fourth fibre port (for example, port 4) is an input for coupling to an optical light source and the first fibre port (for example, port 1) is an output for coupling to optical light receiver.

In an embodiment, the fibre optic coupler has a coupling ratio between the second fibre port (for example, port 2) and the third fibre port (for example, port 3) of more than 50%, in particular a coupling ratio of at least 99%.

In an embodiment, the coupler is a 1×2 bi-directional fibre optic coupler or a 2×2 bi-directional fibre optic coupler on which a fourth fibre port is unused.

In an embodiment, the sensor fibre mirror is also a sensor of the sensor fibre.

An embodiment comprises said sensor fibre.

In an embodiment, the sensor fibre comprises an amplifier.

An embodiment comprises a bidirectional fibre amplifier regardless of its location inside the cavity.

An embodiment comprises a bidirectional amplifier placed in the optical path between the port mirror (for example, mirror 2) and the mirror of the sensor fibre (for example, mirror 1).

In an embodiment, the amplifier may be an Erbium Doped Fibre amplifier, a Semicondutor Optical Amplifier, Raman amplifier or Brillouin Amplifier.

In an embodiment, the mirrors are independently chosen from reflective thin-films, fibre loop mirrors, external mirrors, faraday rotators or fibre Bragg grating structures such as chirped fibre Bragg gratings.

BRIEF DESCRIPTION OF THE DRAWINGS

The following figures provide preferred embodiments for illustrating the description and should not be seen as limiting the scope of invention.

DETAILED DESCRIPTION

Figure 1A:
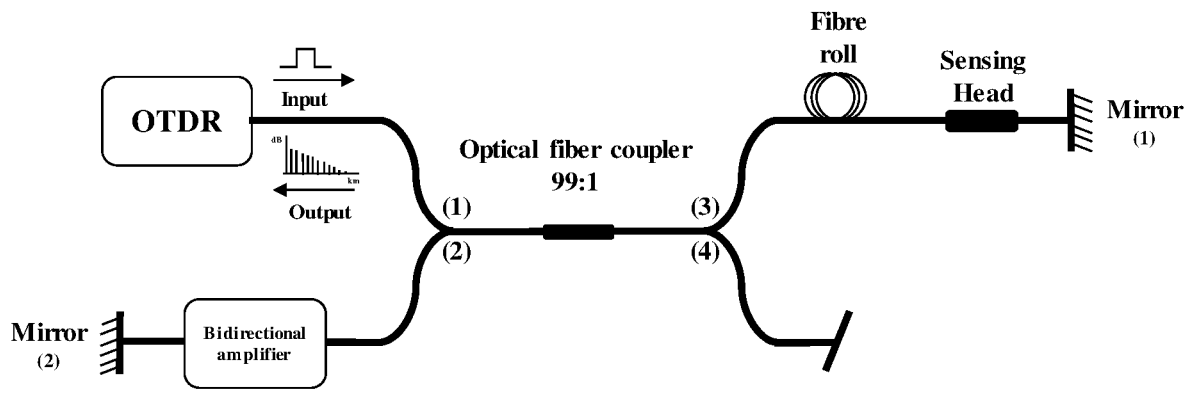
FIG. 1: Schematic representation of embodiments of a linear CRD configuration, in particular (a) wherein both input and output are in port 1, (b) wherein both input and output are in port 4, (c) wherein input is in port 1 and output is in port 4, and (d) wherein input is in port 4 and output is in port 1.
Figure 1B:
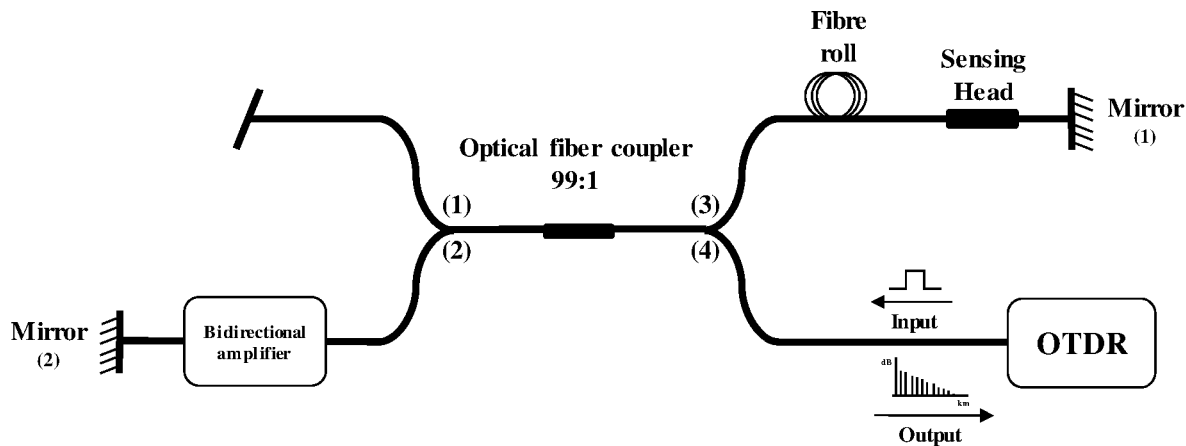
Figure 1C:
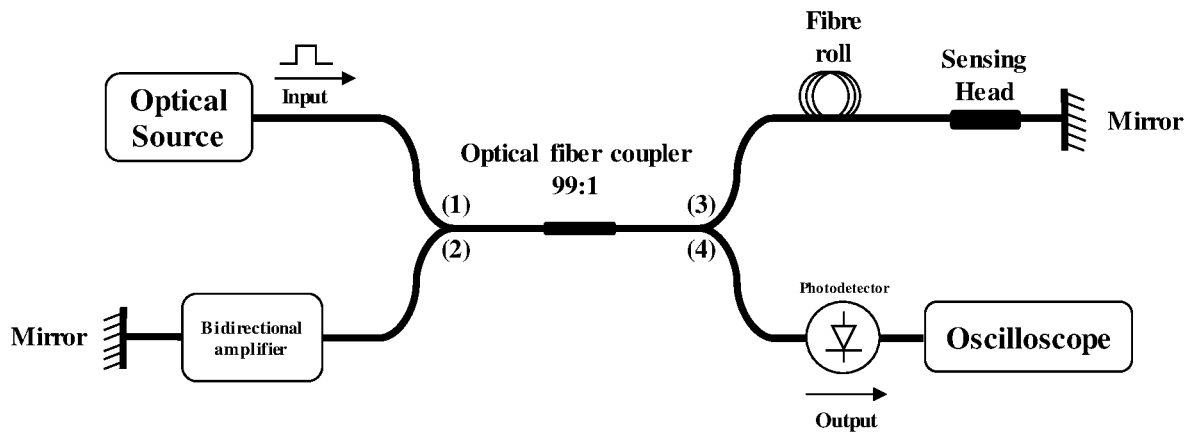
Figure 1D:
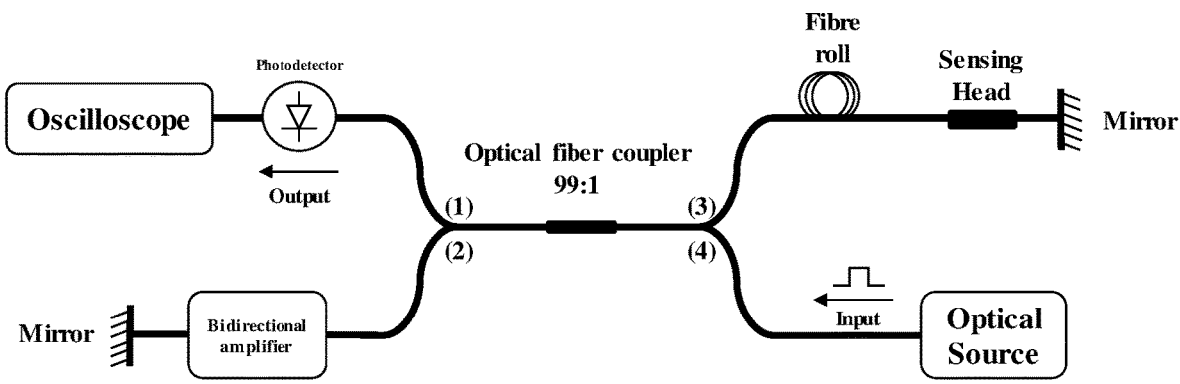
Figure 2A:
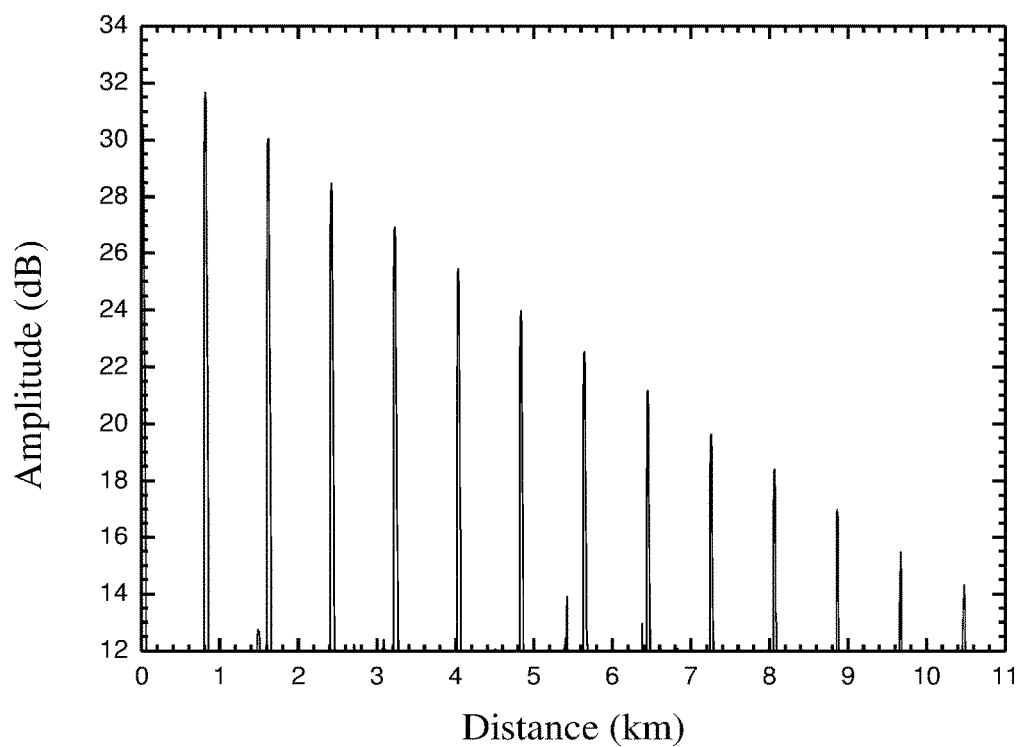
FIG. 2: Output signal of the linear CRD obtained with a)-c) thin-film mirrors and d)-f) fibre loop mirrors. Note that FIG. 2(g) pertains to the embodiments where input and output are not in the same port.
Figure 2B:
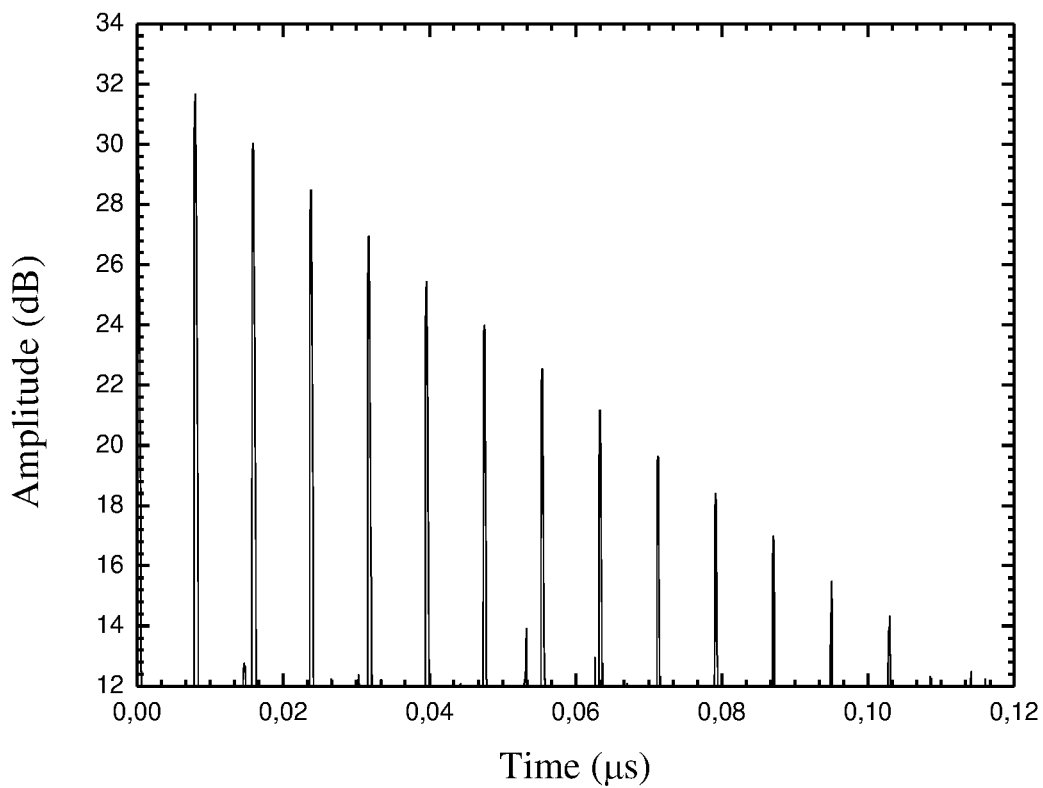
Figure 2C:
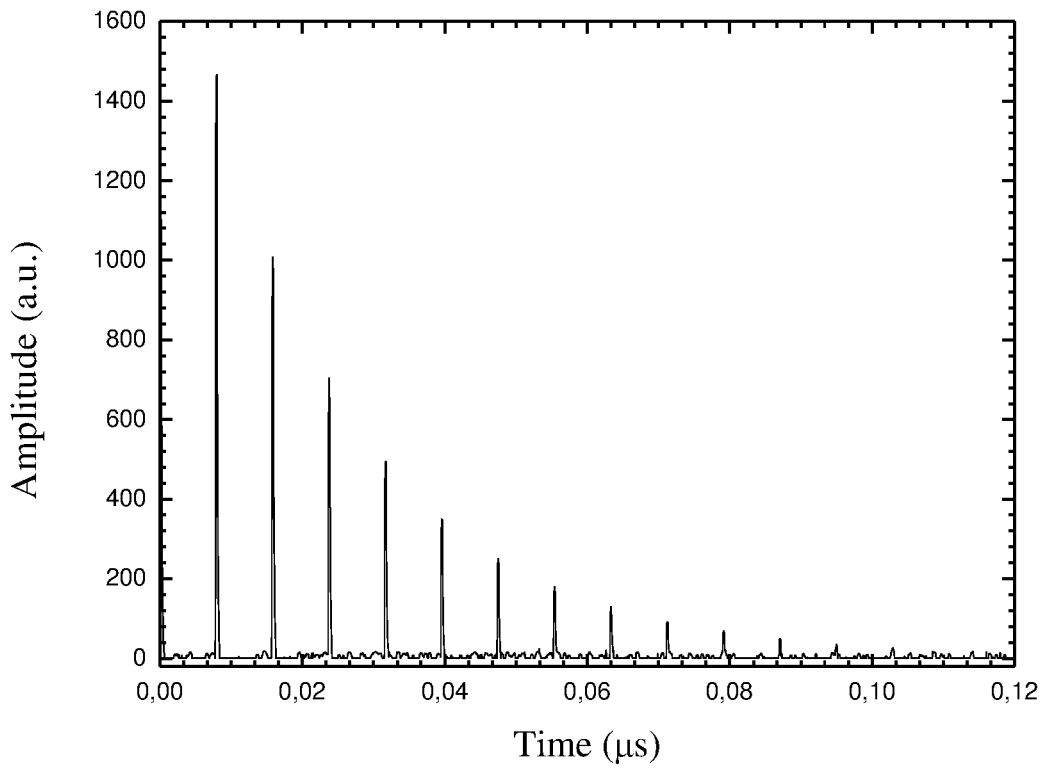
Figure 2D:
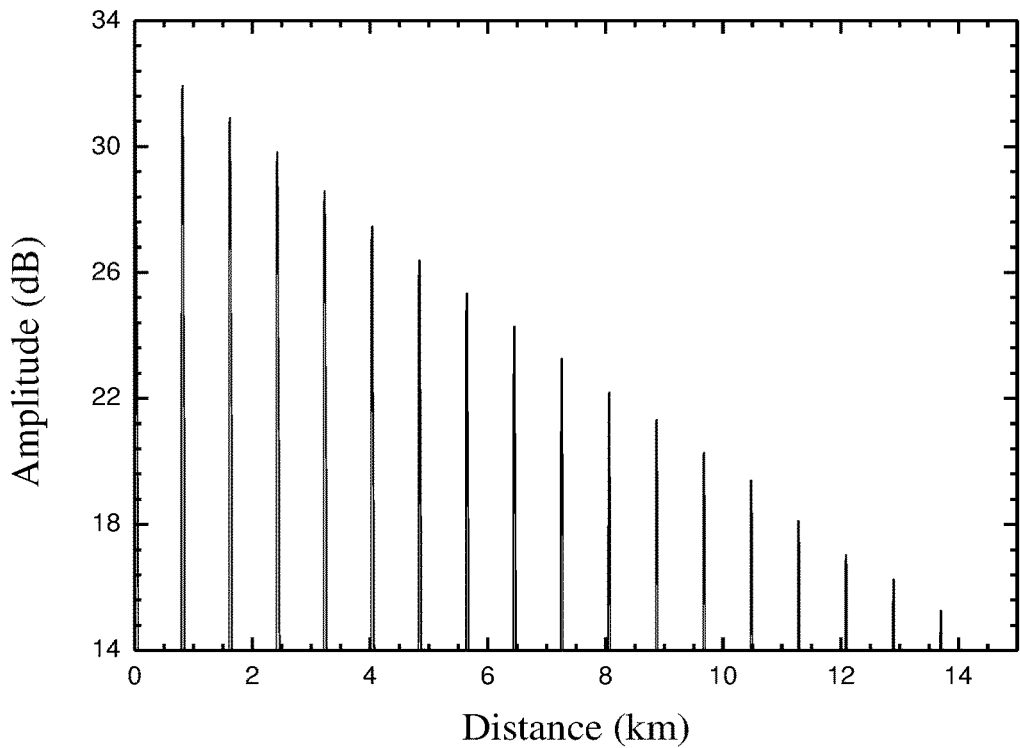
Figure 2E:
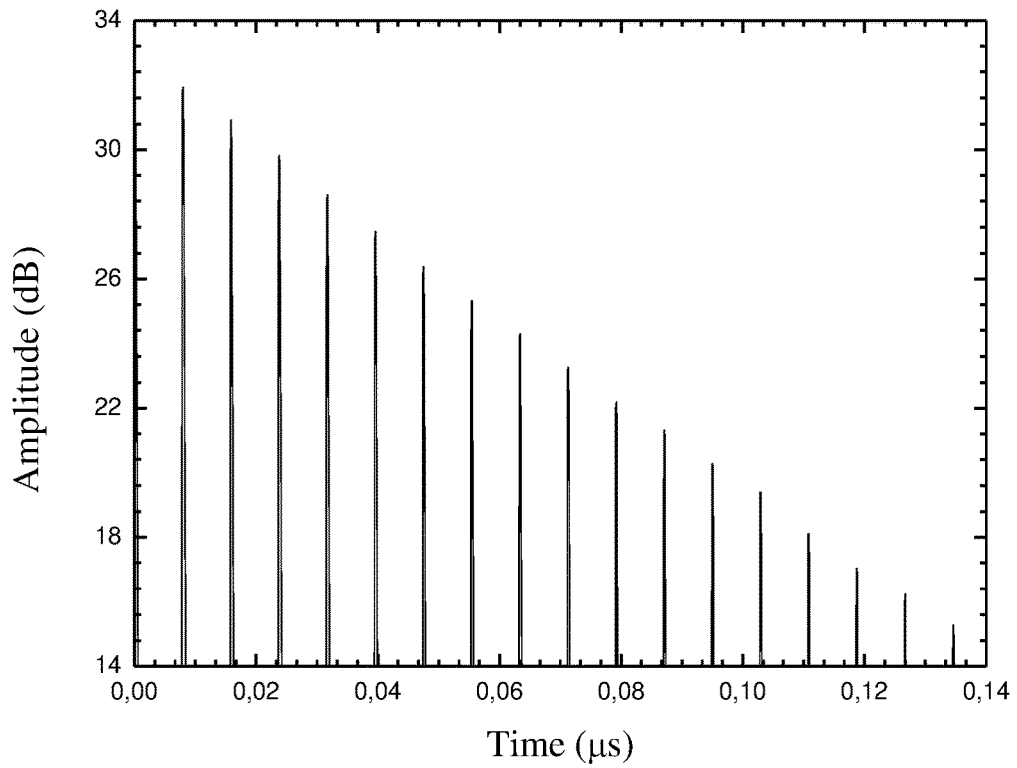
Figure 2F:
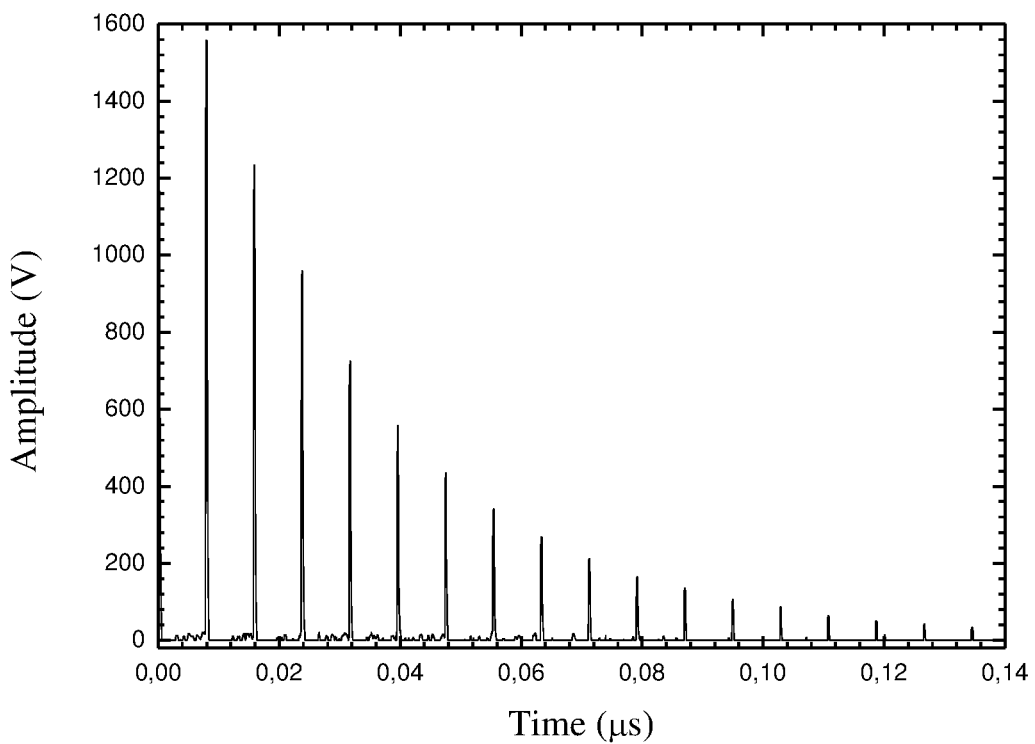
Figure 2G:
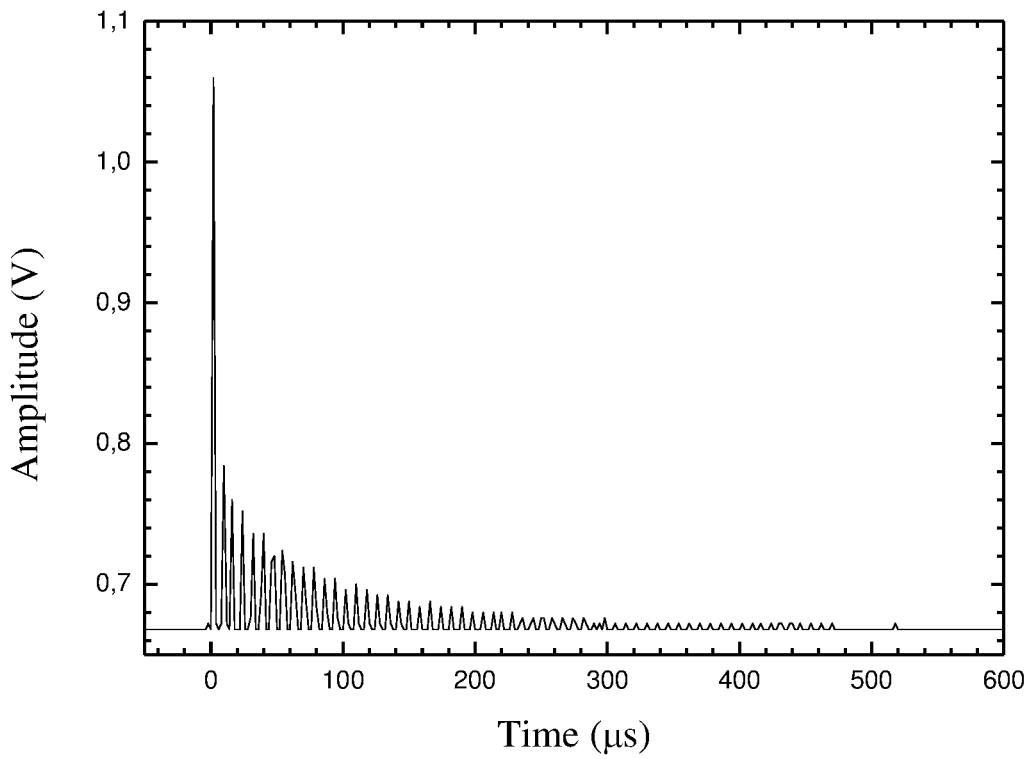

The schematic of an embodiment of the disclosed fibre linear CRD configuration is presented in FIG. 1. Such configuration includes a single fibre coupler, with high splitting ratio, and two thin-film mirrors located at the end of ports 2 and 3. An OTDR is placed in port 1 and serves as both input and output of the system.

The basis of such configuration relies on the following operation principle: the OTDR (centred at 1550 nm) send pulses into the linear cavity, which is formed by an optical fibre coupler with a splitting ratio of, for example, 99:1. Each pulse enters in the cavity by means of 1% arm of the fibre coupler (port 3) and is back-reflected in mirror 1; then, passes through 99% arm of the fibre coupler (port 2) where is back-reflected again in mirror 2. Bidirectional amplification is also required for remote sensing for example in port 2 due to the low amount of light that travels in this fibre arm. In this case, an amplifier, for example an Erbium Doped Fibre amplifier (EDFA), was inserted in the linear cavity to provide an observable signal at the output. In this manner, the amplitude of the pulses will slowly decay as it travels inside the linear cavity, similar to the behaviour of the conventional CRD using a cavity ring. In order to use the proposed configuration for remote sensing, a roll of fibre can be placed in port 3 before the sensor head and the mirror.

One of the advantages of this CRD configuration is that a single fibre coupler with highly reflective mirrors at the end of the fibre arms forms the linear cavity. In addition, the use of an OTDR located in port 1 serves as both input/output of the transmitted/reflected signal. Therefore, the oscilloscope (and photodetector) at the output (port 4) is no longer needed to interrogate the sensing head as the OTDR serves that purpose (as already demonstrated in [11]). This is one of the major advantages of the proposed CRD configuration, combining the fact that the output signal acquired by the OTDR provides measurements in dB, which allows attaining the decay time (μs) with a linear response (rather than an exponential behaviour obtained by the oscilloscope). In addition, an increase of the sensitivity is achieved because the light passes twice by the sensor [13]. Another advantage is that the mirrors can be based on various technologies, such as on highly reflective thin-films, fibre loop mirrors or even FBGs.

In order to validate the disclosure, three distinct types of mirrors were placed at the end of ports 2 and 3, namely, thin-films, fibre loop mirrors and FBGs. The FBG placed in port 3 was used as sensing element as well. For the proof-of-concept, the OTDR was set with an operation wavelength at 1550 nm and it was used to send pulses with 200 ns-width into the linear cavity. A fibre bobbin with ~800 m was also used in port 3 (see FIG. 1).

FIG. 2 shows the trace observed in the OTDR when different mirrors are used, namely, the thin films (FIGS. 2a-c) and the fibre loop mirrors (FIGS. 2d-f), for configurations corresponding to FIGS. 1(a) and (b), where input and output are in the same port. FIG. 2a) presents the trace directly observed on the OTDR, while FIGS. 2b) and c) present the trace after signal processing. The decay time of the proposed linear CRD is 21.47 ns and 30.81 ns for thin-film mirrors and fibre loop mirrors, respectively. Note that FIG. 2(g) pertains to the embodiments where input and output are not in the same port such as FIGS. 2(c) and (d). In FIG. 2(g), the relationship between peak 1 and peak 2 is a ratio of 99:1. However, this signal is only visible in the oscilloscope with amplification, as shown in FIG. 2(g), showing the viability of the configuration (i.e. the first signal peak is not amplified, whereas the other peaks are amplified).

Figure 3A:
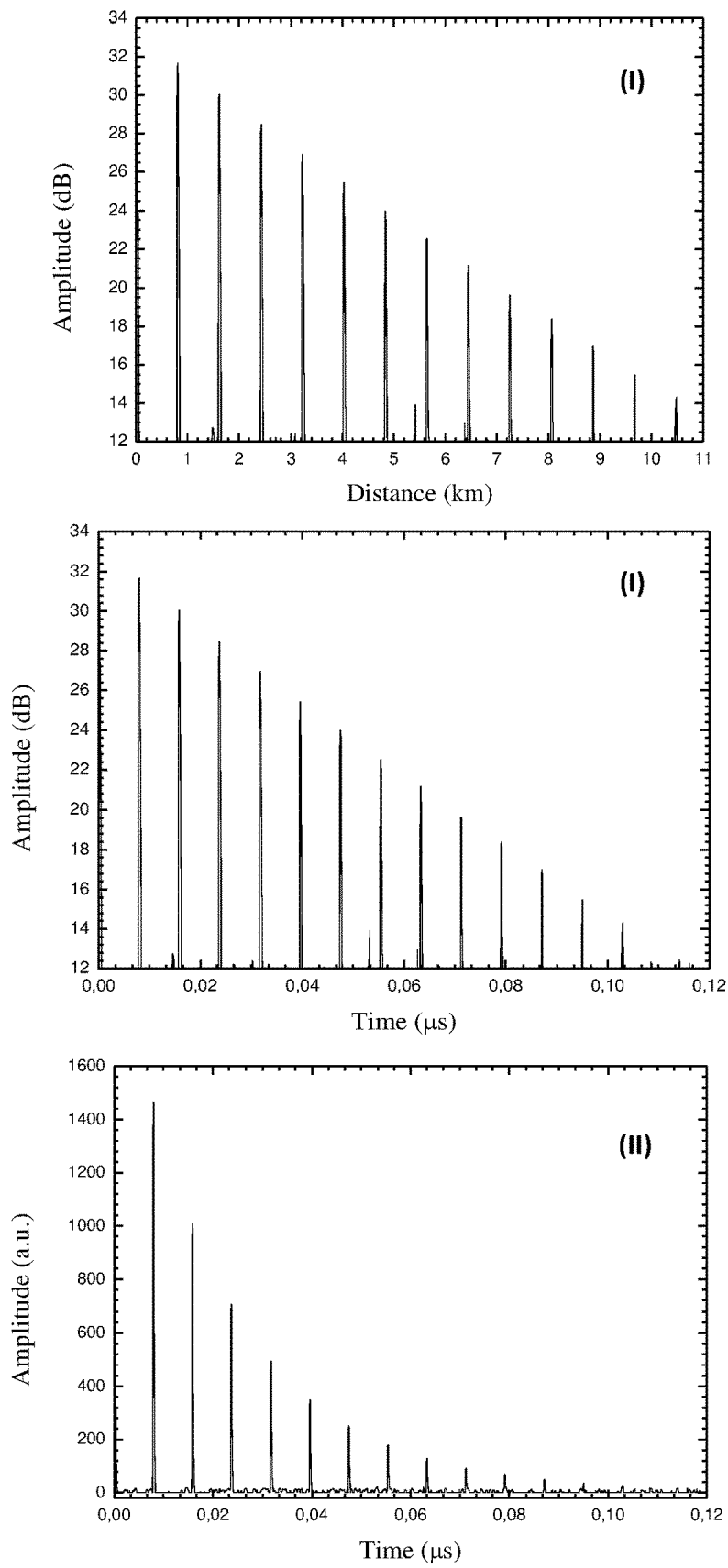
FIG. 3: Output signal of a linear CRD for remote sensing, using a fibre length with a)~800 m, b)~5.5 km, and c)~11 km. Traces in (I) present linear response while in (II) correspond to the exponential behaviour.
Figure 3B:
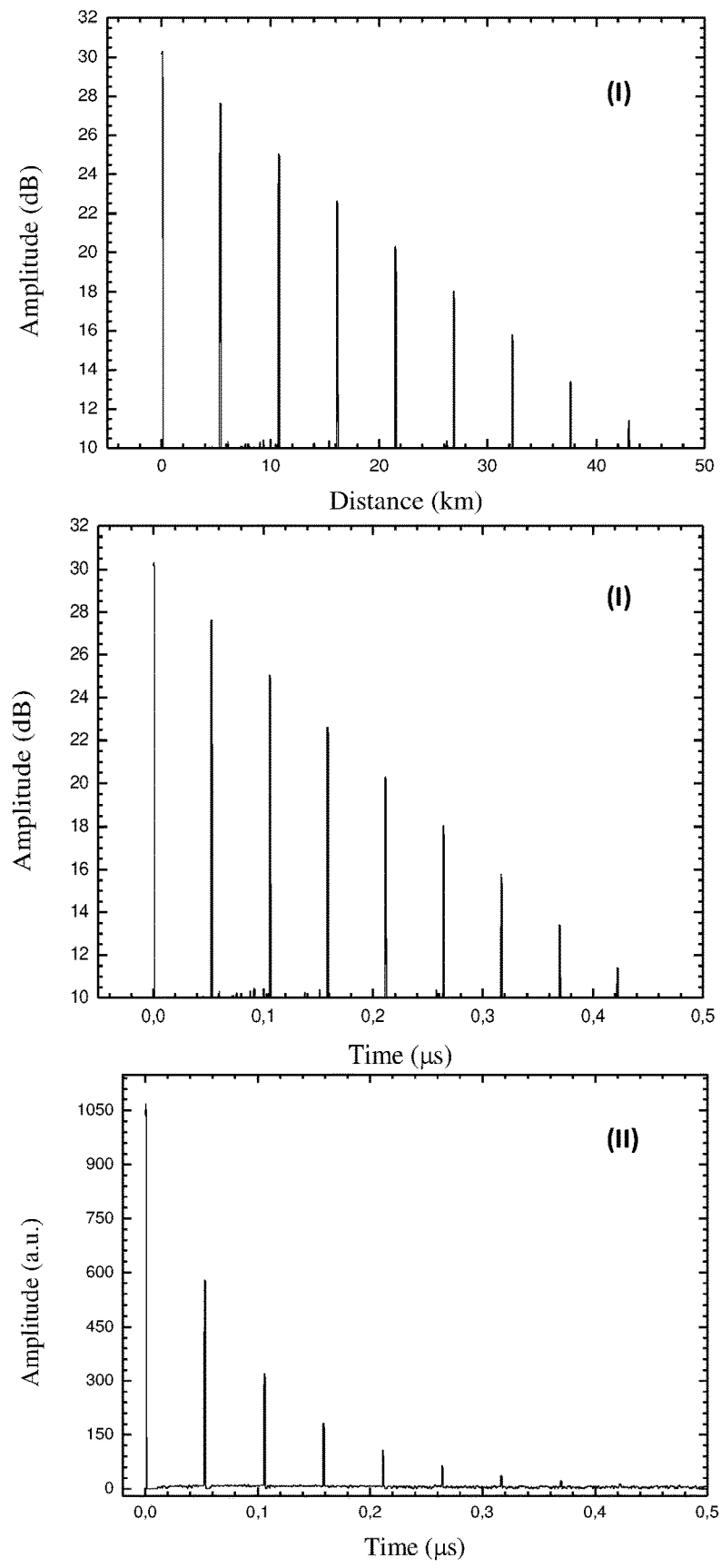
Figure 3C:
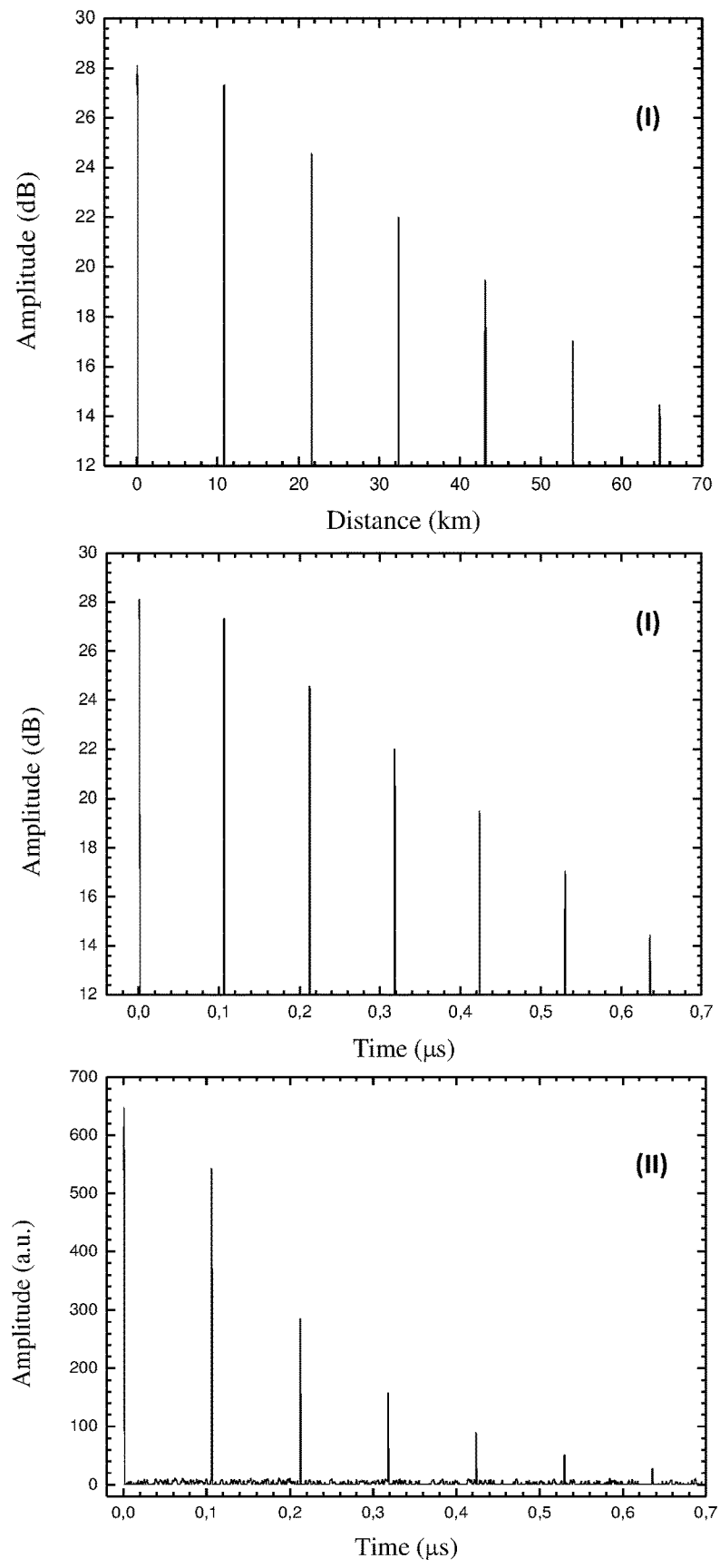
Figure 4:
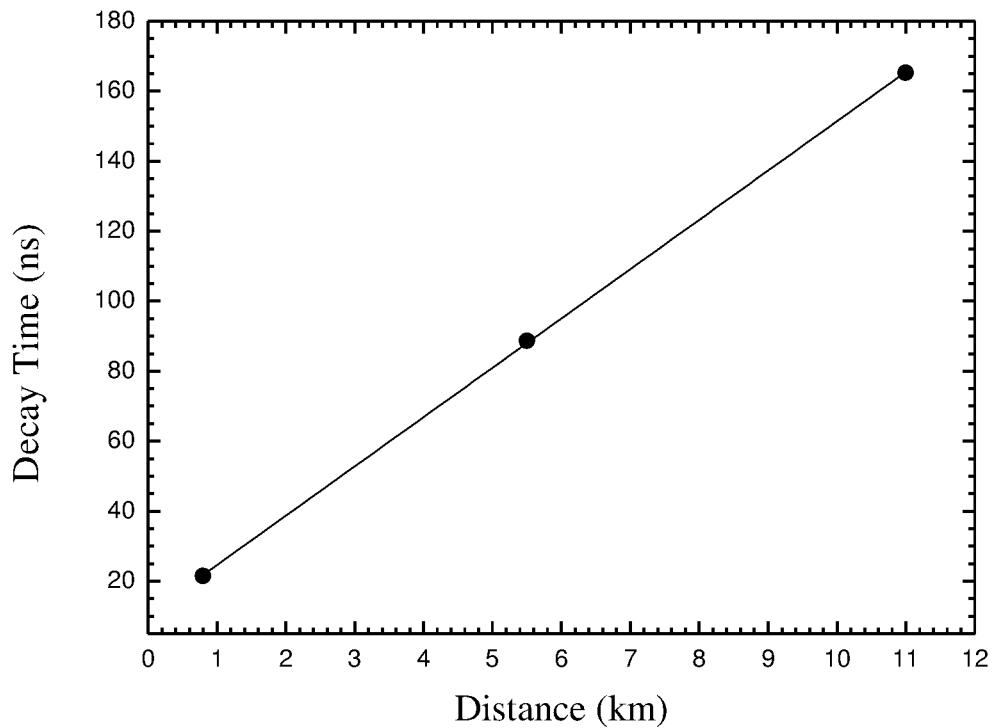
FIG. 4: Decay time (ns) versus fibre length (km) used in port 3 of the linear CRD.

The linear CRD was also demonstrated for remote sensing. In this case, thin-film mirrors were used at the end of ports 2 and 3. FIG. 3a) to c) shows the trace acquired by the OTDR, after signal processing, for fibre lengths with ~800 m, ~5.5 km and ~11 km, respectively, for configurations corresponding to FIGS. 1(a) and (b), where input and output are in the same port. Traces are also depicted by the linear response (I) and the corresponding exponential behaviour (II). The insets of FIG. 3 are the original OTDR traces for each fibre length used in the experiment. The spacing between consecutive peaks increases with increasing fibre length. The decay time was determined for the three increasing fibre lengths and values of 21.47 ns, 88.61 ns and 165.21 ns, respectively, were attained. FIG. 4 presents the linear behaviour of the decay time with increasing fibre length. The fitting was performed and a slope with 14.09 ns/km was obtained.

For the purpose of demonstrating sensing features of the disclosed CRD, a FBG was used as mirror and simultaneously as a sensor in port 3 (see FIG. 1). In this case, a chirped-based FBG was used instead of the standard FBG due to its large bandwidth, acting as a band-rejection filter in reflection. The chirped-FBG placed inside the linear cavity is centred at 1554 nm and it has ~4 nm width. The output signal is back-reflected by mirror 2 and interrogated by the OTDR.

Figure 5A:
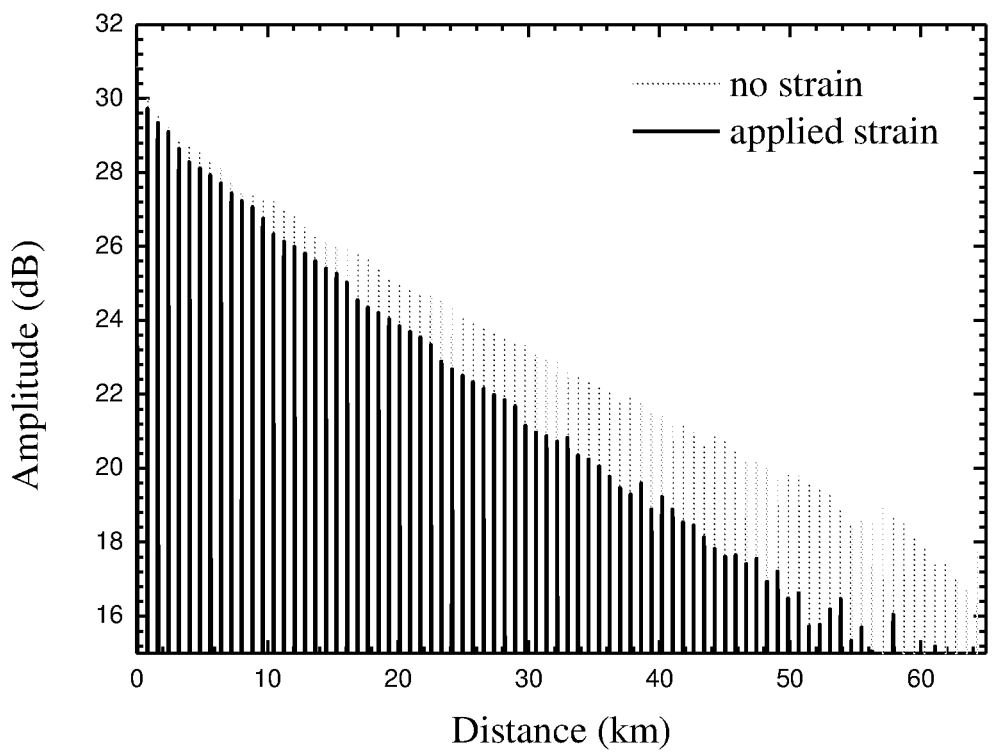
FIG. 5: Output signal of the linear CRD for no strain and strain applied (800 $\mu\epsilon$) to the chirped-FBG. a) Trace directly acquired by the OTDR, b) trace after signal processing and c) the corresponding exponential response.
Figure 5B:
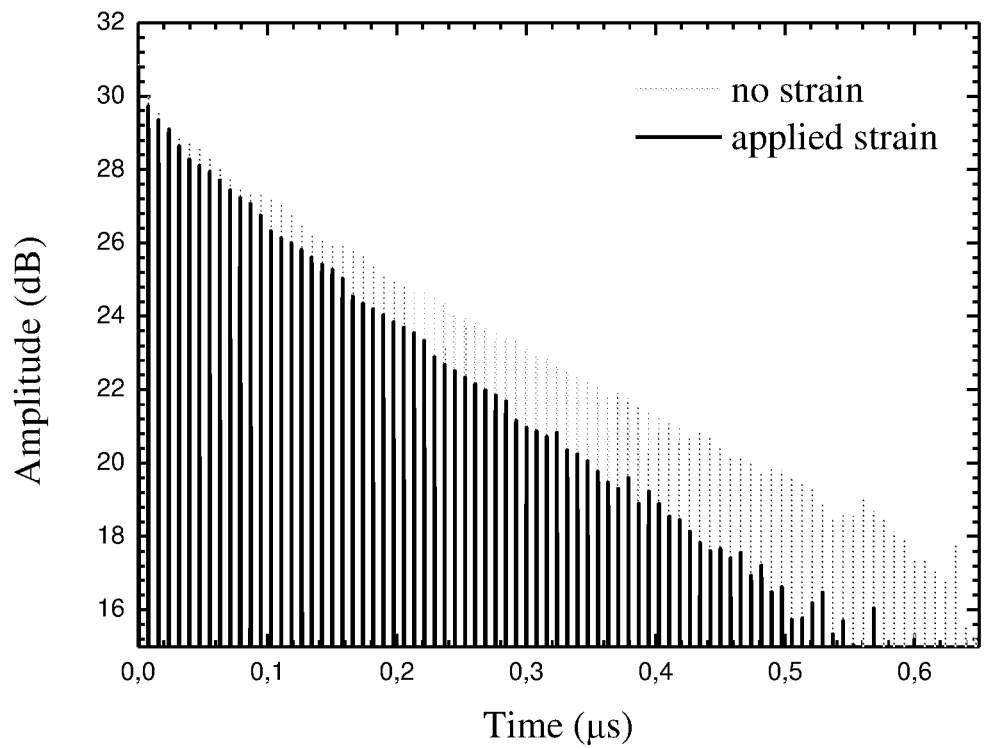
Figure 5C:
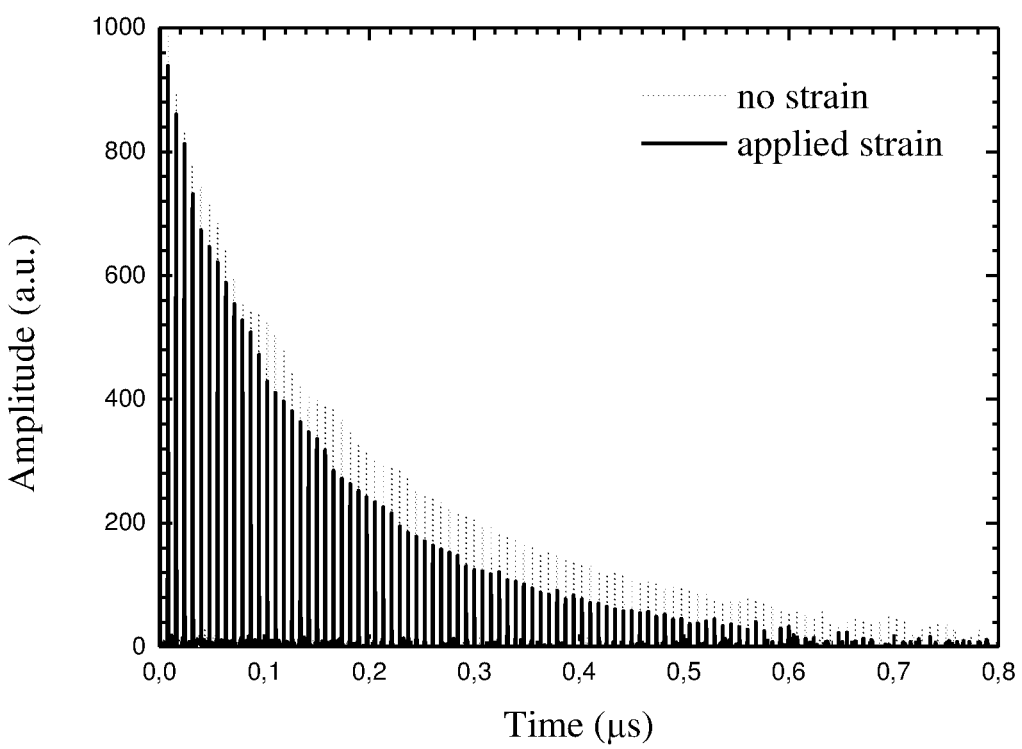

To perform strain measurements, the chirped-FBG was fixed at two points that were 300 mm apart, and submitted to specific strain values by means of a translation stage (via sequential 20 μm displacements). FIG. 5 shows the traces observed in the OTDR for the cases of no strain applied to the sensor and 800με of applied strain, for configurations corresponding to FIGS. 1(a) and (b), where input and output are in the same port. FIG. 5a) shows the trace directly acquired by the OTDR, FIG. 5b) shows the trace after signal processing and c) the corresponding exponential response. Performing the exponential fit of the results obtained in FIG. 5c) it was possible to determine the decay times of 169.12 ns and 133.8 ns for no strain applied to the FBG and 800με of strain applied to the sensor, respectively.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof.

The above described embodiments are combinable.

The following claims further set out particular embodiments of the disclosure.

The invention claimed is:

1. A fiber linear cavity ring down device for decay time-based attenuation sensing, comprising a bi-directional fiber optic coupler having two fiber port coupling sides, a first port side and a second port side, an optical time domain reflectometer and a port mirror;
   wherein the first port side comprises a first fiber port, and a second fiber port coupled to said port mirror,
   wherein the second port side comprises a third fiber port for coupling to a sensor fiber comprising one or more sensors and optically terminated by a mirror of said sensor fiber, and a fourth fiber port, and
   wherein either the first fiber port or the fourth fiber port is coupled to the optical time domain reflectometer as an optical light source and receiver.

2. The fiber linear cavity ring down device according to claim 1, wherein the bi-directional fiber optic coupler comprises two coupled optical fibers:
   a first optical fiber between the first fiber port and third fiber port, and
   a second optical fiber between the second fiber port and fourth fiber port.

3. The fiber linear cavity ring down device according to claim 1, wherein the fiber optic coupler has a coupling ratio between the second fiber port and the third fiber port of more than 50%.

4. The fiber linear cavity ring down device according to claim 1, wherein the coupler is a 1×2 bi-directional fiber optic coupler or a 2×2 bi-directional fiber optic coupler on which a fourth fiber port is unused.

5. The fiber linear cavity ring down device according to claim 1, wherein the sensor fiber mirror is also a sensor of the sensor fiber.

6. The fiber linear cavity ring down device according to claim 1, further comprising said sensor fiber.

7. The fiber linear cavity ring down device according to claim 1, further comprising a bidirectional amplifier placed in the optical path between the port mirror and the mirror of the sensor fiber.

8. The fiber linear cavity ring down device according to claim 7, wherein the amplifier is one of an erbium doped fiber amplifier, a semiconductor optical amplifier, a Raman amplifier, and a Brillouin amplifier.

9. The fiber linear cavity ring down device according to claim 1, wherein the respective mirrors are independently chosen from the group consisting of: reflective thin-films, fiber loop mirrors, external mirrors, faraday rotators, and fiber Bragg grating structures.

10. A method for using a fibre linear cavity ring down device as a decay time-based attenuation sensing device,
wherein the fibre linear cavity ring down device comprises a bi-directional fibre optic coupler having two fibre port coupling sides, a first port side and a second port side, and a port mirror;
wherein the first port side comprises a first fibre port, and a second fibre port coupled to said port mirror; and
wherein the second port side comprises a third fibre port for coupling to a sensor fibre comprising one or more sensors and optically terminated by a mirror of said sensor fibre, and a fourth fibre port,
the method comprising:
coupling either the first fibre port or the fourth fibre port to an optical time domain reflectometer for use as an optical light source and receiver.

11. The method according to claim 10, wherein the bi-directional fiber optic coupler comprises two coupled optical fibers:
a first optical fiber between the first fiber port and third fiber port, and
a second optical fiber between the second fiber port and fourth fiber port.

12. The method according to claim 10, wherein the fiber optic coupler has a coupling ratio between the second fiber port and the third fiber port of more than 50%.

13. The method according to claim 10, wherein the coupler is a 1×2 bi-directional fiber optic coupler or a 2×2 bi-directional fiber optic coupler on which a fourth fiber port is unused.

14. The method according to claim 10, wherein the sensor fiber mirror is also a sensor of the sensor fiber.

15. The method according to claim 10, wherein the fiber linear cavity ring down device comprises said sensor fiber.

16. The method according to claim 10, wherein the fiber linear cavity ring down device comprises a bidirectional amplifier placed in the optical path between the port mirror and the mirror of the sensor fiber.

17. The method according to claim 10, wherein the amplifier is one of an erbium doped fiber amplifier, a semiconductor optical amplifier, a Raman amplifier, and a Brillouin amplifier.

18. The method according to claim 10, wherein the respective mirrors are independently chosen from the group consisting of reflective thin-films, fiber loop mirrors, external mirrors, faraday rotators, and fiber Bragg grating structures.

19. The method according to claim 10, wherein the fiber linear cavity ring down device comprises said optical time domain reflectometer.

* * * * *